Patented Feb. 23, 1937

2,071,419

UNITED STATES PATENT OFFICE 2,071,419

TREATMENT OF TEXTILE MATERIAL

William Henry Moss, London, England, assignor to Celanese Corporation of America, a corporation of Delaware No Drawing. Application January 4, 1934, Serial No. 705,284. In Great Britain January 18, 1933

8 Claims. (Cl. 91—68)

This invention relates to improvements in the manufacture of textile materials and particularly to processes whereby the resistance to creasing and friction and other properties of textile fabrics may be improved, and to the products obtained by these processes.

It has been discovered that the properties of natural and artificial textile materials, e. g. woven fabrics, may be improved by incorporating in them polymerization products of unsaturated aliphatic aldehydes and acids and of esters of such acids. When such substances are applied to the materials in relatively small proportions, products having a reduced tendency to creasing may be obtained, which still retain the properties of softness and ability to "drape" which are desirable in dress fabrics and similar goods, while with increased proportions, e. g. proportions of ½–1 ounce of substance per square yard of material, products which are stiffened but flexible and have a certain springiness may be produced. Such products are valuable for shoe fabrics, upholstering and similar purposes in which resistance to rubbing is desirable. Moreover, materials which are impervious to gases and/or liquids may also be obtained. In general, still higher proportions, e. g. proportions of 2–3 or 5 ounces or more per square yard, are necessary for this purpose.

The present invention, therefore, relates to natural and artificial textile materials having improved properties which contain polymerization products of unsaturated aliphatic aldehydes or acids or of esters of such acids. Examples of suitable compounds from which the polymerization products may be obtained are crotonaldehyde, crotonic acid and its esters, particularly its esters with lower alcohols, acrolein and acrylic acid. Polymerized esters of acrylic acid with methyl or ethyl alcohol such as the substance sold under the trade name of "Plextol A" are found to be particularly valuable for the purposes of the present invention.

Preferably the polymerization products are insoluble in water and dilute aqueous solutions, resistant to heat, for example to temperatures of 45 to 50° C. and preferably up to 100° C. or more, and do not soften or become sticky at moderate temperatures. Further, it is desirable that they should be colorless, and should be soluble in suitable solvents.

Polymerization of the unsaturated compound may be effected after application of the compound to the material, but it is preferably effected before application, at least to some extent. Further polymerization may be brought about after application of the compound, e. g. by heating the material or exposing it to ultra-violet light, depending upon the properties desired in the finished material.

The compositions employed may contain plasticizers to improve their flexibility, though these should not be present in such proportions as to render the finished materials soft or sticky at temperatures to which they would be exposed. It is found, however, that the substances employed according to the present invention yield products which are sufficiently flexible for most purposes without the incorporation of plasticizers, at least in any substantial proportion, which of course is a considerable advantage. Among plasticizers which may be used according to the present invention may be mentioned organic and inorganic derivatives of phenols, for example diphenylol propane and triphenyl and tricresyl phosphates, sulphonamides, sulphonarylides, alkyl phthalates, for example diethyl phthalate and glycol phthalates, diethyl tartrate, derivatives of polyhydric alcohols, for example mono-, di- and triacetin, and products obtainable by the condensation of polyhydroxy alcohols with themselves or with aldehydes or ketones. The compositions may also contain natural resins, e. g. shellac, rosin, mastic, copals and other natural resins and synthetic or semi-synthetic resins, e. g. ester gum, polyhydroxy alcohol-polybasic acid resins, phenol aldehyde and urea aldehyde resins.

Further, the compositions may contain cellulose derivatives, e. g. cellulose acetate, cellulose propionate, butyrate, and nitroacetate and other organic esters or mixed esters of cellulose and cellulose ethers, e. g. methyl, ethyl, butyl, benzyl and oxyethyl cellulose, and ether-esters of cellulose, e. g. ethyl cellulose acetate and oxyethyl cellulose acetate. Thus, a cotton, viscose or other fabric may be printed, coated or impregnated with a solution containing cellulose acetate and a polymerization product such as is employed according to the present invention, and materials having special effects and properties may thus be obtained.

The compositions employed according to the present invention are preferably applied to the materials in solution in suitable volatile or relatively volatile solvents or mixtures thereof, for example acetone, dioxane, and derivatives of dioxane, for example mono- and di-alkyl derivatives, ethylene methylene ether, diacetone alcohol, ethyl lactate, esters and ether esters of glycol, oxanones, which are cyclic compounds containing a ketone group and an oxygen atom, chlorinated compounds, for example trichlorethylene and methylene chloride, ethyl, methyl and other alcohols, and hydrocarbons, for example benzene and toluene. As mentioned above, mixtures of liquids may also be employed, for example mixtures of methylene or ethylene chloride with ethyl or methyl alcohol, or of acetone or dioxane with benzene and/or toluene. In general the liquid medium employed for the application of the composition should not have any pronounced solvent action upon the fibres constituting or contained in the material treated, though the use of a medium having a slight solvent action or latent solvent or swelling action upon such fibres is not excluded and may in fact be advantageous.

Any suitable concentration of the base of the composition may be employed, but in general concentrations of from 8 to 12 up to 15 or even 20% are found suitable.

The application of the composition to the textile material may be effected in any suitable manner, and the choice of method will depend to some extent upon the result it is desired to obtain. Thus when it is desired that the application of the composition should be effected only on one surface of the material, as for example when it is desired to treat the back only of a fabric having a face of artificial or natural silk and a cotton back, the application may be effected by spraying, or by means of rollers, or the composition may be spread upon the surface by means of a doctor blade. When, however, it is desired that both surfaces should be coated with the composition, or if the material is to be thoroughly impregnated with it, bath methods are very suitable, as is also the use of padding rollers. The compositions may also if desired be applied to the materials locally, for example by means of printing rollers or by stencilling. If desired effect materials, e. g. dyestuffs, white or colored pigments or finely divided metals, may be incorporated in the compositions or be applied to the materials previously or subsequently. Thus a fabric having a light coating of a composition according to the present invention may be sprayed, e. g. by means of a Schoop pistol, with a finely divided metal before the coating has hardened and a uniform, shaded or local metallized effect thus obtained.

When the composition has been applied to the materials, it may be dried in any suitable manner, for example by means of a current of air, preferably heated to a moderate temperature, for example 50–80° C. The period of drying will of course depend largely upon the quantity of composition applied to the materials and on its concentration. Thus in the case of using an amount of from ½ to 1 ounce per square yard of material calculated on the dry weight of the base of the composition, a drying time of from 15 minutes to 1 hour may be suitable, while when larger quantities are used, for example 2 to 5 or more ounces per square yard, the drying time necessary may be considerably longer, for example several hours. Shorter periods may, however, be sufficient, particularly at higher temperatures, e. g. from 20–40 minutes at 100° C. The heat employed in drying the material after application of the composition may effect or assist polymerization of the base of the composition or its transformation from the soluble to insoluble form, and substances of this nature may if desired be applied in aqueous solutions or dispersions or in mixtures of water and organic liquids.

The process of the present invention is of particular value in the treatment of woven fabrics containing natural or artificial textile materials, for example cotton, linen, natural silk and artificial silk, for example artificial silk obtained from cellulose acetate or other organic esters or ethers of cellulose and the regenerated cellulosic type of artificial silk obtained by the viscose, cuprammonium or nitrocellulose process. Mixed materials may also be treated with advantage according to the present invention, for example materials containing cellulose acetate and cotton. As mentioned above, the materials may be treated either on one surface or on both, or may be thoroughly impregnated with the composition.

By the process of the present invention it is possible to obtain materials having increased stiffness which are nevertheless flexible, and which have an improved strength and resistance to rubbing and which are of value for furnishing and shoe fabrics and for other purposes for which a certain strength and fullness is desirable. Further, if desired, the nature of the composition and/or its application may be such that a gas-tight material is obtained which is of value in the manufacture of fabric for balloons or other gas containers, and for other purposes in which impermeability to gases and/or liquids is desired. Among other advantages of the products of the present invention may be mentioned their water-proof properties.

While the invention has been particularly described with relation to the treatment of woven fabrics, it may also be applied to other materials, for example knitted or netted fabrics and filaments, threads, yarns and the like before their formation into fabrics. Further, in the case of artificial filaments and the like, particularly when it is desired to introduce only small proportions for the purpose of improving the resistance to creasing of the products obtained, the compounds employed according to the present invention may be incorporated in the spinning solutions from which the materials are obtained.

The following examples are given in order to illustrate the invention, but do not, of course, limit it in any way:—

*Example 1*

A fabric having a cotton back and a cellulose acetate silk face is coated on the cotton side only with a solution of the polymerization product of the methyl ester of acrylic acids such as "Plextol A" in a solvent mixture consisting of 40 parts of benzene, 40 parts of toluene and 20 parts of acetone by volume, the concentration of the solution being about 10%. The amount of solution applied is sufficient to give about ¼ to ¾ of an ounce of the base of the solution per square yard of fabric. After application of the solution, the solvent is evaporated and the fabric dried by heating it to a temperature of 80–100° C. for from 15 minutes to 1 hour.

By the process described in the above example a stiffened fabric may be obtained which has considerable flexibility and is very suitable for use as a shoe fabric or upholstering material or for similar purposes.

*Example 2*

A similar fabric to that obtained according to Example 1 may be produced in a similar manner by the use of a 6–8% solution of the base in trichlorethylene.

Example 3

A material which is very suitable for use in the production of gas containers or other articles in which impermeability to gases is desired may be obtained by passing cotton fabric through a bath of a solution such as that employed in Example 1 or 2, or by otherwise impregnating it with the solution so that a material containing about 2–5 ounces of the base per square yard is obtained after drying. Drying is carried out at about 90–100° C. for from ½ to 2 or 3 hours.

The terms "impregnated" or "impregnating" employed in the claims are, where the context admits, to be understood to include products or processes wherein impregnation is effected either throughout the materials or partially only, e. g. on one face only.

What I claim and desire to secure by Letters Patent is:—

1. A fabric having an increased resistance to creasing impregnated with at most one ounce per square yard of fabric of a solid substance selected from the group consisting of polymerization products of unsaturated aliphatic aldehydes and polymerization products of esters of unsaturated aliphatic acids, which is substantially insoluble in water and in dilute aqueous media.

2. A fabric having an increased resistance to creasing which contains artificial threads having a basis of a water-insoluble organic derivative of cellulose and which is impregnated with at most one ounce per square yard of fabric of a solid substance selected from the group consisting of polymerization products of unsaturated aliphatic aldehydes and polymerization products of esters of unsaturated aliphatic acids, which is substantially insoluble in water and in dilute aqueous media.

3. A fabric having an increased resistance to creasing which contains artificial threads having a basis of cellulose acetate and which is impregnated with at most one ounce per square yard of fabric of a solid substance selected from the group consisting of polymerization products of unsaturated aliphatic aldehydes and polymerization products of esters of unsaturated aliphatic acids, which is substantially insoluble in water and in dilute aqueous media.

4. A fabric according to claim 2 wherein the solid substance is a polymerization product of an ester of an unsaturated lower aliphatic acid.

5. A fabric according to claim 3 wherein the solid substance is a polymerization product of an ester of an unsaturated lower aliphatic acid.

6. A fabric according to claim 3 wherein the solid substance is a polymerization product of the methyl ester of acrylic acid.

7. Process for the manufacture of textile materials having an increased resistance to creasing, which comprises impregnating a fabric which contains artificial threads having a basis of a water-insoluble organic derivative of cellulose with at most one ounce per square yard of fabric of a solid substance selected from the group consisting of polymerization products of unsaturated aliphatic aldehydes and polymerization products of esters of unsaturated aliphatic acids, which is substantially insoluble in water and in dilute aqueous media, the impregnation being effected in a liquid medium having a swelling action on a constituent of the fabric.

8. Process for the manufacture of textile materials having an increased resistance to creasing, which comprises impregnating a fabric which contains artificial threads having a basis of cellulose acetate with at most one ounce per square yard of fabric of a solid polymerization product of the methyl ester of acrylic acid, the impregnation being effected in a liquid medium having a swelling action on the cellulose acetate.

WILLIAM HENRY MOSS.